United States Patent
Lewis et al.

(10) Patent No.: US 6,725,372 B1
(45) Date of Patent: Apr. 20, 2004

(54) DIGITAL WATERMARKING

(75) Inventors: Arianne M. Lewis, Chestnut Hill, MA (US); Evert Basch, Stow, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/453,333

(22) Filed: Dec. 2, 1999

(51) Int. Cl.$^7$ ................................................ H04L 9/32
(52) U.S. Cl. ........................ 713/176; 382/100; 380/210; 380/201; 380/202; 380/203
(58) Field of Search .......................... 713/176; 382/100; 380/210, 201, 202, 203

(56) References Cited

U.S. PATENT DOCUMENTS

| | | | | |
|---|---|---|---|---|
| 5,901,178 A | * | 5/1999 | Lee et al. | .................... 375/240 |
| 6,477,276 B1 | * | 11/2002 | Inoue et al. | ................. 382/232 |
| 6,532,541 B1 | * | 3/2003 | Chang et al. | ............... 713/176 |

OTHER PUBLICATIONS

Bender et al., "Techniques for data hiding," IBM Systems Journal, 35:3&4 (1966) pp. 313–335.

Liehua Xie et al., "Secure MPEG Video Communication by Watermarking," (Abstract) Proceedings, Third Annual Federated Laboratory Symposium on Advanced Telecommunications/Information Distribution Research Program (ATIRP), pp. 459–463.

Liehua Xie et al., "A Blind Content Based Digital Image Signature," (Abstract) Proceedings, Second Annual FedLab Symposium (1998) pp. 211–215.

Cox et al., "Secure Spread Spectrum Watermarking for Multimedia," IEEE Transactions on Image Processing, vol. 6, No. 12 (1997) pp. 1673–1687.

\* cited by examiner

*Primary Examiner*—Gilberto Barrón
*Assistant Examiner*—Joseph M McArdle
(74) *Attorney, Agent, or Firm*—Leonard C. Suchyta, Esq.; Kevin Oliver, Esq.

(57) ABSTRACT

The invention is a system for digital watermarking that operates on a conventional digital video stream to etch, on hand, and read, on the other hand, digital watermarks in the stream that do not visibly interfere with the video content. A system according to the invention operates on digital data that has been transformed into the spatial-frequency domain, using inter-block differences between spatial-frequency coefficients to encode the bits of a digital watermark. Using the principles of the invention, it is possible to encode multiple watermark bits between two adjacent blocks, thus providing higher watermark data rates relative to underlying video content.

41 Claims, 11 Drawing Sheets

DIGITAL WATERMARKING

STATEMENT REGARDING FEDERALLY SPONSORED RESEARCH OR DEVELOPMENT

This invention was made with Government support under Contract No. DAAL-01-96-2-0002, awarded by the U.S. Army Research Laboratory. The Government has certain rights in this invention

BACKGROUND OF THE INVENTION

1. Field of the Invention

This application relates to the field of digital multimedia and more particularly to the field of watermarking digital multimedia content.

2. Description of Related Art

Enforcing ownership rights in digital content may be difficult due to the relative ease with which the content can be reproduced and distributed. Secure communication provides one form of protection. Encryption may prevent outsiders from viewing a video sequence, but once the video stream has been decrypted, there is no protection against manipulation and redistribution of the stream. Further, where widespread distribution of multimedia content is desired, key-management for a typical public key encryption scheme becomes cumbersome. In addition, encryption may require error-free communications, which may not be available in all networks, particularly in a wireless network. Thus, there is an interest in supplemental security methods for multimedia content.

Another form of protection is provided by a message authentication code ("MAC") that is attached to digital content. For example, origination information may appear within a message field appended to digital content. However, this type of add-on authentication is easily identified and removed. A more resilient MAC system is provided by digital watermarking.

Digital watermarking is a technique for hiding an identification of origin in a digital media stream. A digital watermark is actually embedded in the media stream in a way that inhibits removal without destroying the underlying content. The watermark may also be folded into the original data in a manner that is imperceptible to the listener/viewer. When such watermarked digital content is distributed on-line, or recorded on a disk, the origination data travels with it, and allows the originator to demonstrate the source of the content. Digital watermarking also identifies tampering, since any manipulation of a sequence will result in an invalid watermark.

One technique for encoding multimedia content is detailed in the well-known Moving Picture Experts Group ("MPEG") 2 standard. MPEG-2 is based upon a process of breaking an image frame up into fixed-size blocks, converting the blocks to luminance/chrominance data, transforming the blocks using a discrete cosine transform ("DCT"), and quantizing the transformed data. The resulting "I frame" includes Y blocks for luminance (four in MPEG-2's main level at main profile) and C blocks for chrominance (two in the main level at main profile) for each block of the frame. Each block contains a matrix of coefficients calculated from a Y or C block using the DCT. This step compresses data by removing so-called spatial redundancies, which may loosely be considered as similar-looking content in different areas of a block. Variable-length coding is then used to compress long runs of zeroes that are typical of high spatial-frequency coefficients. Still further compression is achieved by coding consecutive frames into "P frames" (predictive) and "B frames" (bi-directional), which only include information describing changes relative to neighboring chronological frames.

One known technique for watermarking such an MPEG-2 video stream is to use the DC coefficients of the Y blocks in each I frame of the MPEG-2 stream to effectively form a parity bit. According to this technique, the median DC coefficient of each sequential group of three Y blocks is forced to be always even or odd, depending on the watermark bit being encoded. This technique has a minimal impact on image quality and is relatively simple to implement. However, as a significant disadvantage thereof, this technique is not particularly robust. In many instances, only one out of every fifteen frames of an MPEG-2 video stream is an I frame, only two out of three blocks in an I frame is a Y block, and only one out of every three Y blocks is coded for watermarking. In those instances, very few bits of the overall bit stream are actually used for a watermark. Thus a relatively small amount of data corruption from bit errors in the data channel can effectively erase a watermark. At the same time, it is less likely that minor, intentional alterations will be detected.

There remains a need for a digital watermarking scheme that provides high watermark bit rates (relative to the overlying digital content) while remaining imperceptible to content users. A successful watermark would retain its signature in the presence of an error-prone data channel, and would correctly alert a watermark user to data tampering.

SUMMARY OF THE INVENTION

In accordance with the principles of the invention, there is provided digital watermarking that operates on a conventional digital video stream to etch, on hand, and read, on the other hand, digital watermarks in the stream that do not visibly interfere with the video content. The technique operates on digital data that has been transformed into the spatial-frequency domain, using inter-block differences between spatial-frequency coefficients to encode the bits of a digital watermark. According to the principles of the invention, it is possible to encode multiple watermark bits between two adjacent blocks, thus providing higher watermark data rates relative to underlying video content.

In one aspect, there is provided etching a digital watermark by: providing a watermark bit; providing a digital media stream comprising a first block and a second block, the first block comprising a first plurality of coefficients, and the second block comprising a second plurality of coefficients, each one of the second plurality of coefficients corresponding to one of the first plurality of coefficients; and setting a first difference to a predetermined value according to the watermark bit, the first difference being a difference between a first coefficient of the first block and a corresponding first coefficient of the second block.

This aspect may further include repeating the above for a plurality of consecutive watermark bits and a plurality of consecutive blocks, wherein the second block is used as a new first block, and a third consecutive block is used as a new second block. This aspect may also include setting the first difference to a predetermined value according to the watermark bit further includes forcing the first difference to a first level if the watermark bit is a one, and forcing the first difference to a second level if the watermark bit is a zero. In this aspect, the first level may be a binary even level and the second level may be a binary odd level. Setting the first difference to a binary even level may further include adding a quantization level to the corresponding first coefficient if the first difference is odd, and wherein setting the first difference to a binary odd level further includes adding a quantization level to the corresponding first coefficient if the first difference is even.

This aspect may further include: providing a second watermark bit; and setting a second difference to a predetermined value according to the second watermark bit, the second difference being a difference between a second coefficient of the first block and a corresponding second coefficient of the second block. The plurality of consecutive watermark bits may include an encrypted watermark. The digital media stream may include a Motion Picture Expert Group video stream, the first coefficient being a DC coefficient. The digital media stream may include a Motion Picture Expert Group video stream, the first coefficient being an AC coefficient.

In a different aspect, there is provided reading a digital watermark by: receiving a digital media stream comprising a first block and a second block, the first block comprising a first plurality of coefficients, and the second block comprising a second plurality of coefficients, each one of the second plurality of coefficients corresponding to one of the first plurality of coefficients; determining a first difference between a first coefficient of the first block and a corresponding first coefficient of the second block; and determining a watermark bit, the watermark bit having a predetermined value according to the first difference.

This aspect may further include repeating the above for a plurality of consecutive blocks, wherein the second block is used as a new first block, and a third consecutive block is used as a new second block, thereby determining a plurality of consecutive watermark bits. The predetermined value may be a one if the first difference has a first level, and the predetermined value may be a zero if the first difference has a second level. The first level may be a binary even level and the second level may be a binary odd level.

This aspect may further include determining a second difference between a second coefficient of the first block and a corresponding second coefficient of the second block, and determining a second watermark bit, the second watermark bit having a second predetermined value according to the second difference. The plurality of consecutive watermark bits may include an encrypted watermark. The digital media stream may include a Motion Picture Expert Group video stream and the first coefficient is a DC coefficient. The digital media stream may include a Motion Picture Expert Group video stream and the first coefficient is an AC coefficient.

In a different aspect, there is provided a system for etching a digital watermark that includes means for providing a watermark bit; means for providing a digital media stream comprising a first block and a second block, the first block comprising a first plurality of coefficients, and the second block comprising a second plurality of coefficients, each one of the second plurality of coefficients corresponding to one of the first plurality of coefficients; means for either setting a first difference to a first level if the watermark bit is a one, or setting the first difference to a second level if the watermark bit is a zero, the first difference being a difference between a first coefficient of the first block and a corresponding first coefficient of the second block; and means for providing a plurality of consecutive watermark bits and a plurality of consecutive blocks to the above means, wherein the second block is used as a new first block, and a third consecutive block is used as a new second block.

In this aspect, the first level may be a binary even level and the second level may be a binary odd level. This aspect may further include means for providing a second watermark bit; and means for either setting a second difference to be even if the watermark bit is a one, or setting the second difference to be odd if the watermark bit is a zero, the second difference being a difference between a second coefficient of the first block and a corresponding second coefficient of the second block. There may also be provided means for encrypting the plurality of consecutive watermark bits into an encrypted watermark. There may also be provided means for variable-length decoding the first plurality of coefficients and the second plurality of coefficients before applying the determining means and the setting means, and means for variable-length coding the first plurality of coefficients and the second plurality of coefficients after applying the determining means and the setting means.

In a different aspect, there may be provided a digital video encoder that includes a watermark source, the watermark source providing a plurality of watermark bits; a transform unit, the transform unit receiving a plurality of blocks of video data and performing a two-dimensional transform on each block to provide a transformed block, each transformed block including a plurality of coefficients; a quantizer, the quantizer receiving each transformed block and scaling each coefficient of each transformed block using a quantization index, thereby providing a plurality of quantized blocks; and a watermark unit, the watermark unit receiving one of the plurality of watermark bits from the watermark source, a first one of the plurality of quantized blocks, and a second one of the plurality of quantized blocks, the watermark unit encoding the one of the plurality of watermark bits by setting a difference to be even if the one of the plurality of watermark bits has a first value and setting the difference to be odd if the one of the plurality of watermark bits has a second value, the difference being a difference between a first coefficient of the first one of the plurality of quantized blocks and a corresponding first coefficient of the second one of the plurality of quantized blocks.

In this aspect, the first coefficient and the corresponding first coefficient may be DC coefficients. The first coefficient and the corresponding first coefficient may be AC coefficients. Setting the difference to be even may include adding a quantization level to the corresponding first coefficient if the difference is odd, and setting the difference to be odd may include adding a quantization level to the corresponding first coefficient if the difference is even. The plurality of quantized blocks may include a Motion Picture Expert Group video stream.

In a different aspect, there is provided a digital watermark embodied in a digital video stream carrier signal, the digital watermark comprising a plurality of watermark bits, each watermark bit having a value encoded between consecutive blocks of the digital video stream, the value being a first value when a difference between a pair of consecutive corresponding coefficients is even, and the value being a second value when the difference between the pair of consecutive corresponding coefficients is odd.

In this aspect, the first value may be one and the second value may be zero. The first value may be zero and the second value may be one. The pair of consecutive corresponding coefficients may each be DC coefficients. The pair of consecutive corresponding coefficients may each be AC coefficients.

In a different aspect, there is provided a computer program product for etching a digital watermark, embodied in machine executable code for performing the following steps: providing a watermark bit; providing a digital media stream comprising a first block and a second block, the first block comprising a first plurality of coefficients, and the second block comprising a second plurality of coefficients, each one of the second plurality of coefficients corresponding to one of the first plurality of coefficients; and setting a first difference to a predetermined value according to the watermark bit, the first difference being a difference between a first coefficient of the first block and a corresponding first coefficient of the second block.

In this aspect, there may be further provided machine executable code for repeating the above for a plurality of consecutive watermark bits and a plurality of consecutive blocks, wherein the second block is used as a new first block, and a third consecutive block is used as a new second block. Setting the first difference to a predetermined value according to the watermark bit may further include setting the first difference to a first level if the watermark bit is a one, and setting the first difference to a second level if the watermark bit is a zero. The first level may be a binary even level and the second level may be a binary odd level. Setting the first difference to a binary even level may further include adding a quantization level to the corresponding first coefficient if the first difference is odd, and setting the first difference to a binary odd level may further include adding a quantization level to the corresponding first coefficient if the first difference is even. The computer program product may further comprise machine executable code for providing a second watermark bit; and setting a second difference to a predetermined value according to the second watermark bit, the second difference being a difference between a second coefficient of the first block and a corresponding second coefficient of the second block. The plurality of consecutive watermark bits may include an encrypted watermark.

The digital media stream may includes a Motion Picture Expert Group video stream, the first coefficient being a DC coefficient. The digital media stream may include a Motion Picture Expert Group video stream, the first coefficient being an AC coefficient.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF THE PREFERRED EMBODIMENT(S)

To provide an overall understanding of the invention, certain illustrative embodiments will now be described, including a system and method for digitally watermarking an MPEG-2 video stream. However, it will be understood by those of ordinary skill in the art that the methods and systems described herein can be suitably adapted to any system for coding digital multimedia including digital versatile disk, compact disk video, personal computer video, streaming Internet video, digital cable television, and digital satellite television. As used herein, the term "multimedia" refers to any medium or combination of media, such as still video, motion video, audio, and the like. The methods and systems described herein are particularly applicable to those coding schemes based on frequency-transformed image data including MPEG-1, MPEG-2, MPEG-4, and known teleconferencing standards. As used herein, the term "MPEG" is specifically intended to refer to the MPEG-2 video standard, as well as the MPEG-1 and MPEG-4 standards. Further, as used herein, the term "watermark" refers to any digital sequence embedded into a digital media stream, and the term "message authentication code" refers to a particular digital sequence indicative of digital media origin. A message authentication code may be embedded into a digital media stream as a watermark.

To provide an overall understanding of the invention, certain illustrative embodiments will now be described, including a system and method for generating a histogram message authentication code from an MPEG-2 video stream. However, it will be understood by those of ordinary skill in the art that the methods and systems described herein can be suitably adapted to any system for coding digital multimedia including digital versatile disk, compact disk video, personal computer video, streaming Internet video, digital cable television, and digital satellite television. As used herein, the term "multimedia" refers to any medium or combination of media, such as still video, motion video, audio, and the like. The methods and systems described herein are particularly applicable to those coding schemes based on frequency-transformed image data including MPEG-1, MPEG-2, MPEG-4, and known teleconferencing standards. As used herein, the term "MPEG" is specifically intended to refer to the MPEG-2 video standard, as well as the MPEG-1 and MPEG-4 standards. Further, as used herein, the term "watermark" refers to any digital sequence embedded into a digital media stream, and the term "message authentication code" refers to a particular digital sequence indicative of digital media origin, such as the histogram watermark. A message authentication code may be embedded into a digital media stream as a watermark.

Figure 1:
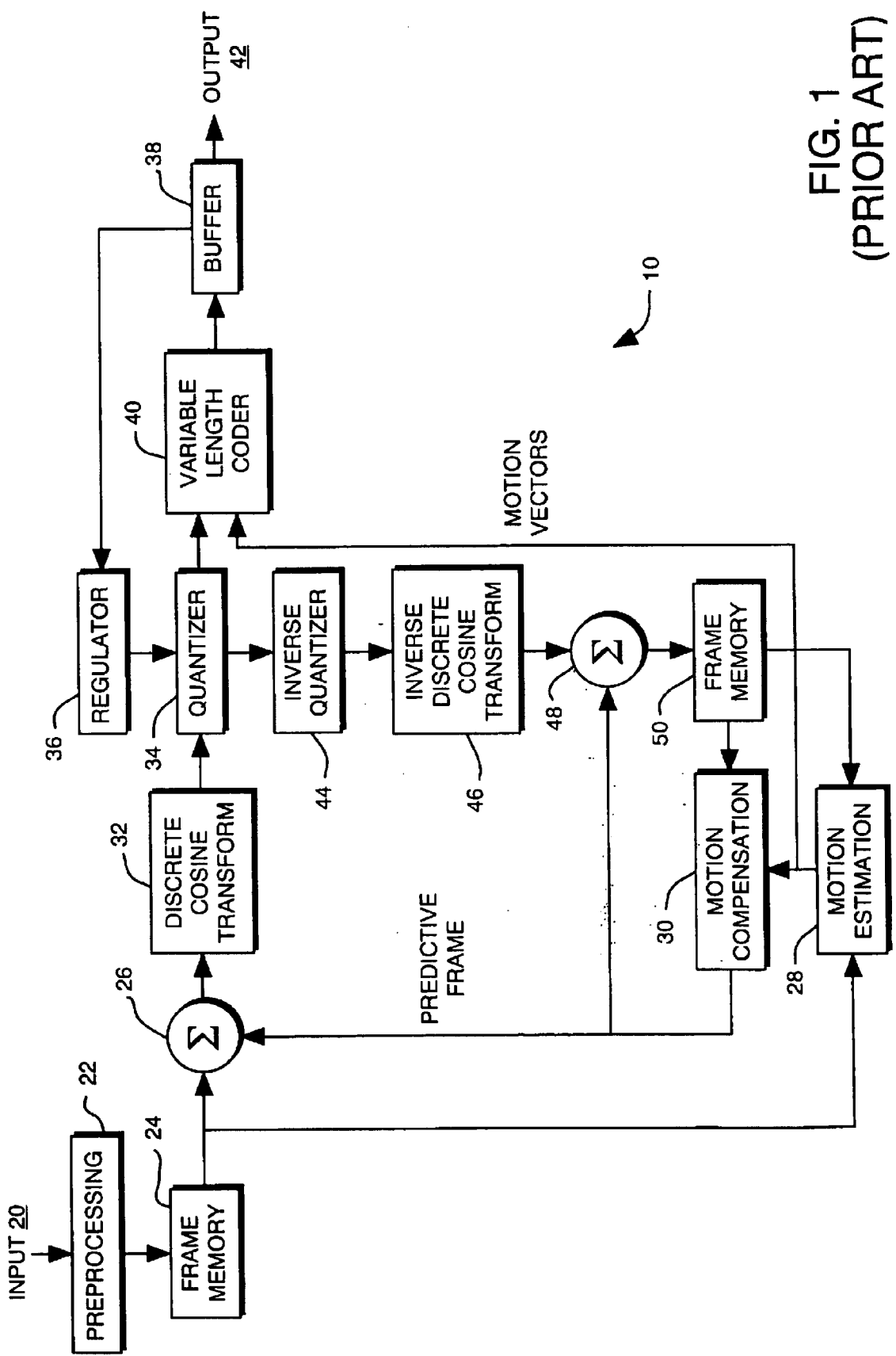
FIG. 1 is a block diagram of a prior art MPEG encoder.

FIG. 1 shows a prior art MPEG encoder 10 in block diagram form. A video input 20 is received by a pre-processing unit 22. The pre-processing unit 22 performs functions required to convert the video input 20 into a form amenable to MPEG encoding. In particular, the pre-processing unit digitizes the video input 20 with an analog/digital converter (if the input 20 is analog) and divides the digitized video into sixteen-by-sixteen pixel squares, or "blocks." The pre-processing unit 22 then converts each digitized block into a luminance-chrominance representation such as YCbCr. A block encoded using a conventional 4:2:0 format for luminance-chrominance has four luminance blocks ($Y_1$–$Y_4$) and two chrominance blocks ($C_b$, $C_r$). Other formats, such as 4:2:2, may also be used. Some sources for video input 20 will already be in a suitable YCbCr format.

Pre-processed blocks are stored in a first frame memory 24 where they may be sequentially fed to a first pixel-by-pixel summing junction 26. The blocks are also fed to a motion estimation unit 28 for comparison to reconstructed previous images. The summing junction 26 receives predictive or differential image data from a motion compensation unit 30. Here, MPEG compression is improved by allowing the system to operate on a difference image between a current image and an earlier image. A difference image (the complete current image, when encoding an I frame) is provided from the summing junction 26 to a discrete cosine transform ("DCT") unit 32, which performs a two-dimensional DCT on the difference image to provide a transformed block. While the MPEG standard specifies a particular DCT, it will be appreciated that other types of DCT and other transforms are known and may be usefully employed in accordance with the teachings herein.

The transformed block is provided from the DCT unit 32 to a quantizer 34 where each block is quantized using an eight-by-eight quantization index to provide a quantized block. Using this technique, each value in the transformed block is scaled by a corresponding value in the quantization index, thus allowing independent scaling for each spatial frequency in the quantized block. The quantization index may vary depending on whether a block is an I, P, or B block. A regulator 36 monitors a buffer 38 to prevent overflow of the capacity of the buffer 38. In order to prevent overflow, the regulator 36 may modify the quantization index to achieve greater data compression in the quantizer 34 (at the expense of image quality). A variable-length coder ("VLC") 40 achieves further compression of an output stream by re-arranging the values in the quantized block and truncating extended runs of zeros. The VLC 40 provides a variable-length coded output to the buffer 38. The above MPEG encoder 10 thus produces a compressed video output 42 from the video input 20. The output from the quantizer 34 is also fed back to achieve greater compression through differential imaging. The quantizer 34 output is provided to an inverse quantizer which de-quantizes each block. An inverse DCT unit 46 transforms each de-quantized block from the spatial-frequency domain back into the spatial domain to provide a reverse-transformed block. Any differential data from the motion compensation unit 30 is added to the reverse-transformed block in a second pixel-by-pixel summing junction 48, thereby generating a reconstructed block that is stored in a second frame memory 50. It is noted that each reconstructed block is identical to a corresponding block generated by an MPEG decoder that receives the compressed video output 42.

Each reconstructed block from the second frame memory 50 is compared to the sixteen-by-sixteen macroblocks of the next image in the first frame memory 24 in the motion estimation unit 28. The motion estimation unit 28 then generates motion vectors describing where in the next image any macroblocks from the previous image appear. The motion compensation unit 30 uses these motion vectors to generate differential image data. The motion vectors are also forwarded to the variable length coder 40 for transmission as a part of the compressed video output 42. An MPEG decoder receiving the motion vectors can use them, along with the differential image data, to reconstruct a complete image.

Figure 2:
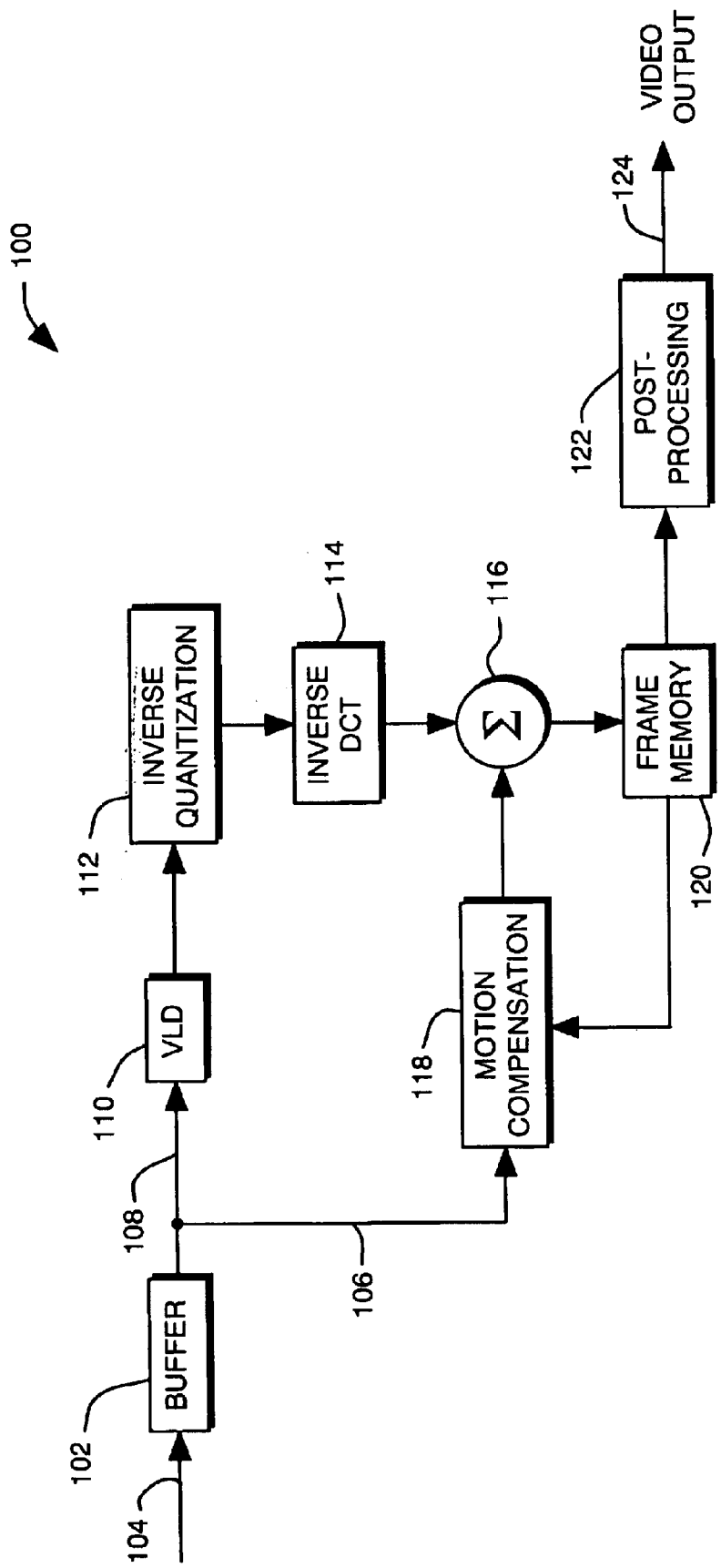
FIG. 2 is a block diagram of a prior art MPEG decoder.

FIG. 2 shows a prior art MPEG decoder 100 in block diagram form. The MPEG decoder 100 includes a buffer 102 to receive and buffer an incoming digital bit stream 104, including a compressed video stream such as the compressed video output 42 from the MPEG encoder 10 of FIG. 1. The buffer 102 divides the incoming digital bit stream 104 into motion vectors 106 and compressed frames 108 of image data. A variable-length decoder 110 decodes the compressed frames 108 into blocks. The blocks are provided to an inverse quantization unit 112 that re-scales the blocks using the same quantization index used by the quantizer 34 of FIG. 1. These re-scaled blocks are then provided to an inverse DCT unit 114 where an inverse DCT is performed on the re-scaled blocks to transform the spatial-frequency domain blocks back to the spatial domain, thereby providing spatial domain blocks.

The spatial domain blocks are then provided to a pixel-by-pixel summing junction 116 where motion compensation data from a motion compensation unit 118 is added to provide reconstructed blocks to a frame memory 120. The reconstructed blocks are then provided to a post-processing unit 122, where they are converted into a form for video output 124, which may be accomplished by a digital/analog converter for analog output. For some applications digital output is appropriate, such as a digital display, or a computer memory, disk drive, or other digital storage device. The frame memory 120 buffers consecutive reconstructed blocks. These buffered blocks are fed back to the motion compensation unit 118, where they are used in conjunction with the motion vectors 106 to generate differential image data. In the case of an I block, which encodes all image data, there is no differential image data.

It will be appreciated that a number of techniques are known for implementing the MPEG encoder 10 and the MPEG decoder 100 described above. All of the functions, except for analog/digital and digital/analog conversion of the video signal, may be accomplished with software executing on a microprocessor in a computer, or on a microcontroller or programmable digital signal processor in an embedded system. The system may be integrated in its entirety into an application-specific integrated circuit, programmable gate array, programmable logic device, or other system-on-a-chip design. Additionally, a number of video processing chips and chip sets are commercially available that are pre-configured to code and decode MPEG-2 media streams. Any of these devices may be adapted to operate according to the teachings of the invention.

Figure 3:
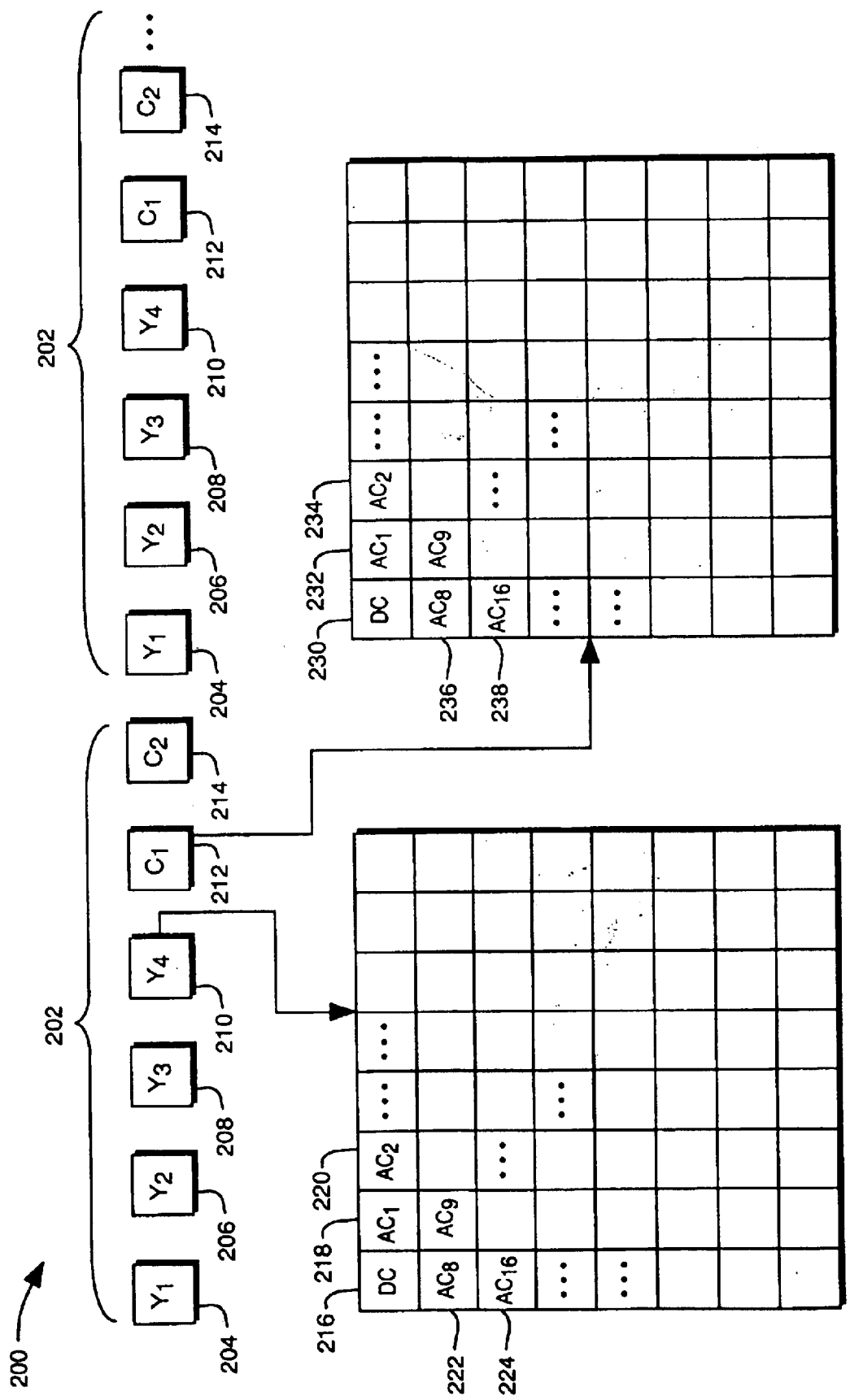
FIG. 3 is a diagram of data structures that may be included in an MPEG video stream.

FIG. 3 is a diagram of data structures that may be used in an MPEG video stream. A stream of data 200 leaves the quantizer 34 of the MPEG encoder 10. Each macroblock 202 of an original image has been converted into four Y blocks 204–210 and two C blocks 212–214 (the C blocks are also referred to as a $C_b$ block 212 and a $C_r$ block 214), which collectively represent a sixteen-by-sixteen pixel block of the original image. The macroblocks are pieced back together by the decoder 100 to form a reconstructed image. It will be appreciated that a complete MPEG stream also includes motion vectors, audio data, and other content interspersed as appropriate among consecutive macroblocks.

Each of the Y blocks 204–210 includes a DC coefficient 216 and a plurality of AC coefficients 218–224. Each of the C blocks is similarly arranged, and contains a DC coefficient 230 and a plurality of AC coefficients 232–238. The DC coefficients 216, 230 represent the lowest spatial frequency of the DCT, i.e., a zero-frequency component, while the AC coefficients 218–224, 232–238 represent progressively higher spatial frequency components as one progresses down and to the right in the Y or C blocks 204–214. In general, the lower, right portion of this representation includes many zeroes, which are efficiently compressed by variable-length coding.

In short, a watermark is inserted into these blocks 204–214 by setting a difference between corresponding coefficients of consecutive blocks to be even for one watermark bit and odd for another watermark bit. As an example, the difference may be forced even for a watermark bit of one, and odd for a watermark bit of zero. First, there is determined a difference between two corresponding coefficients in consecutive blocks, such as the DC coefficient 216 of the Y block 210 and the DC coefficient 230 of the C block 212. If this difference is even and the associated watermark bit is a one, then no change is necessary. However, if the watermark bit is a zero, then the DC coefficient 230 of the C block 212 is increased by one quantization level, or one binary step, so that the difference is odd. Decoding the watermark then becomes a simple task of comparing coefficients in consecutive macroblocks and assigning a one to each even difference and a zero to each odd difference. An embodiment of the watermarking process may be described by the following pseudo-code:

```
! next_bit is the next watermark bit
! n is the current block
! c is the coefficient number (0 = DC, 1 = AC1, ... )
! COEFF(c,n) is the cth coefficient of the nth block
! number_of_blocks is the number of blocks in the stream
for (n = 0; n < number_of_blocks; ++n)
    for (c = 0; 3)
    {
        x = next_bit
        if (x == 1)
        {
            if ((COEFF(c,n+1) - COEFF(c,n)) == even)
                COEFF(c,n+1) = COEFF(c,n+1);
            else if ((COEFF(c,n+1) - COEFF(c,n)) == odd)
                COEFF(c,n+1) = COEFF(c,n+1) + 1;
        }
        else if (x==0)
        {
            if ((COEFF(c,n+1) - COEFF(c,n)) == even)
                COEFF(c,n+1) = COEFF(c,n+1) + 1;
            else if ((COEFF(c,n+1) - COEFF(c,n)) == odd)
                COEFF(c,n+1) = COEFF(c,n+1);
        }
    }
```

It will be appreciated that, although FIG. 3 shows a Y block followed by a C block, a watermark bit may also be encoded between two consecutive Y blocks (e.g., blocks 204–206), two consecutive C blocks (e.g., 212–214), or a C block followed by a Y block. It will further be appreciated that different schemes may be usefully employed. For example, a watermark bit of one may be encoded into an odd difference and a watermark bit of zero may be encoded into an even difference. Also, although corresponding DC coefficients 216, 230 are described above, other corresponding coefficients from consecutive blocks may be used, such as a first AC coefficient 218 from the Y block 210 and a first AC coefficient 232 from the C block 212. This is shown in the above pseudo-code, which operates on the first four coefficients (0<=c<=3) of each block. In this manner, a number of watermark bits may be encoded between two consecutive blocks. Any such corresponding coefficients from consecutive blocks may be used, provided they have significant, non-zero values. When coefficients having near-zero values are used, such as typically found in higher spatial frequencies, visible watermarking artifacts may occur in reconstructed images. Also, using higher spatial frequency coefficients, which are often zero, may diminish the compression benefits of variable-length coding. It will additionally be appreciated that watermarking may be performed after application of the DCT and before quantization. However, since the quantization scale, or quantization levels, used for each coefficient are different, and may vary dynamically under control of the regulator 36, it is preferred to perform the watermarking after quantization.

Figure 4:
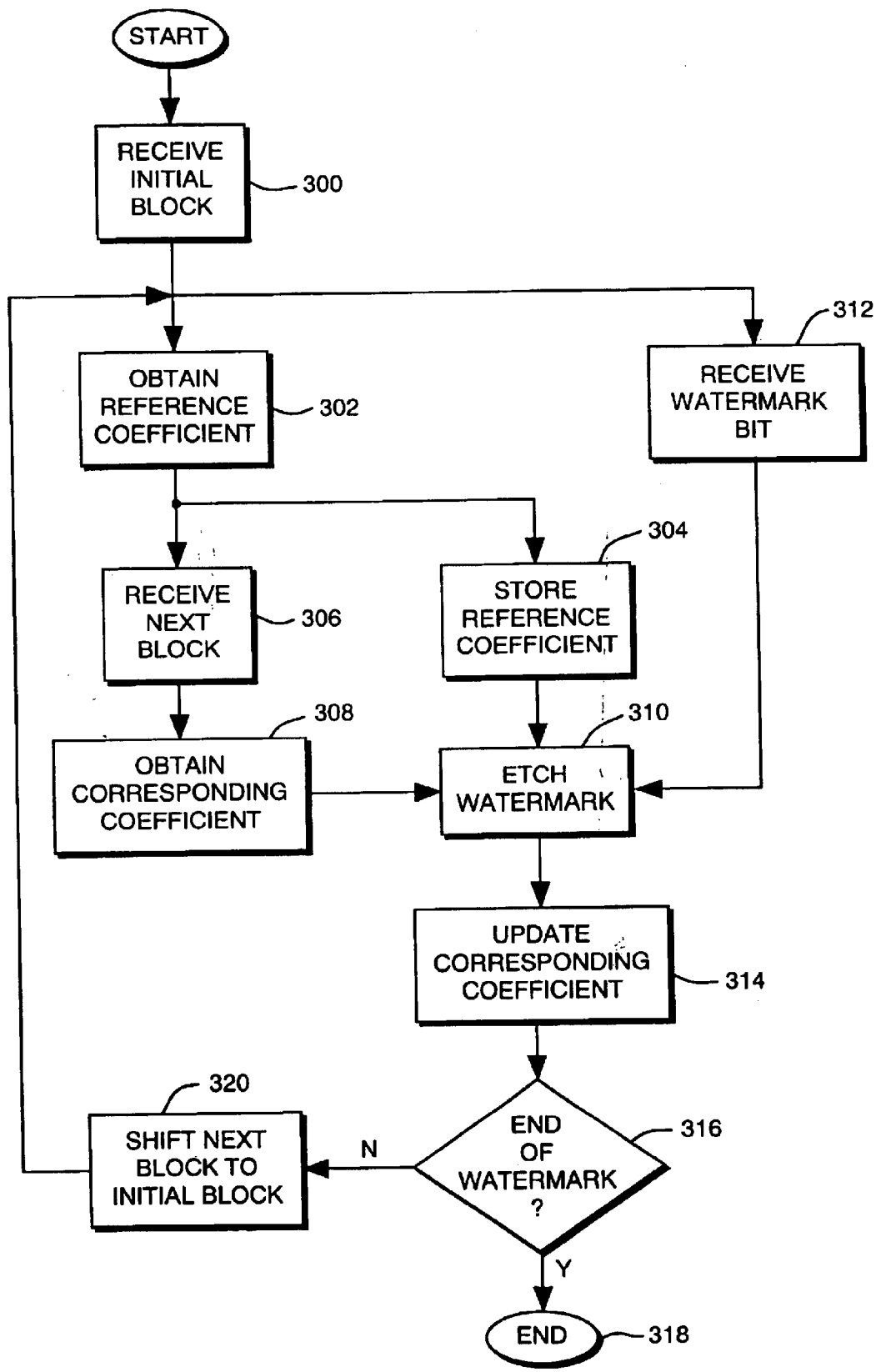
FIG. 4 is a flow chart describing an embodiment of a watermarking operation.

FIG. 4 is a flow chart describing an embodiment of a watermarking operation according to the system described herein. The operation starts with receiving an initial block of video data, as shown in step 300. The initial block is a transformed, spatial-frequency block, and preferably a quantized block. In step 302, a reference coefficient is obtained, which may be a DC or a low spatial frequency AC coefficient. The reference coefficient is stored 304, and a next block is received 306. A corresponding coefficient is obtained from the next block 308, which is a coefficient having the same spatial frequency as the reference coefficient. Prior to etching a watermark 310, a watermark bit is also received as in step 312 from a source independent of the source of blocks of video data.

In the watermark etching step 310, one of the watermark etching processes described above is applied. This may be, for example setting a difference between the reference coefficient and the corresponding coefficient to be even if the watermark bit is a one, and setting the difference to be odd if the watermark bit is a zero. In step 314, the corresponding coefficient in the next block is updated according to the watermark etching step 310. Then, as shown in step 316, if the end of the watermark has been reached, the watermark etching operation may be terminated 318. If the end of the watermark has not been reached, then the next block becomes a new initial block 320, with the updated corresponding coefficient becoming the new reference coefficient.

The steps detailed in FIG. 4 may be readily transformed into computer executable steps for use with a processor, or converted to other hardware, software, or mixed hardware/software signal processing forms for use in a digital video system. Reading a watermark bit etched with this process requires only obtaining a reference coefficient from an initial block, obtaining a corresponding coefficient from a next block, and determining whether the difference is odd or even.

Figure 5A:
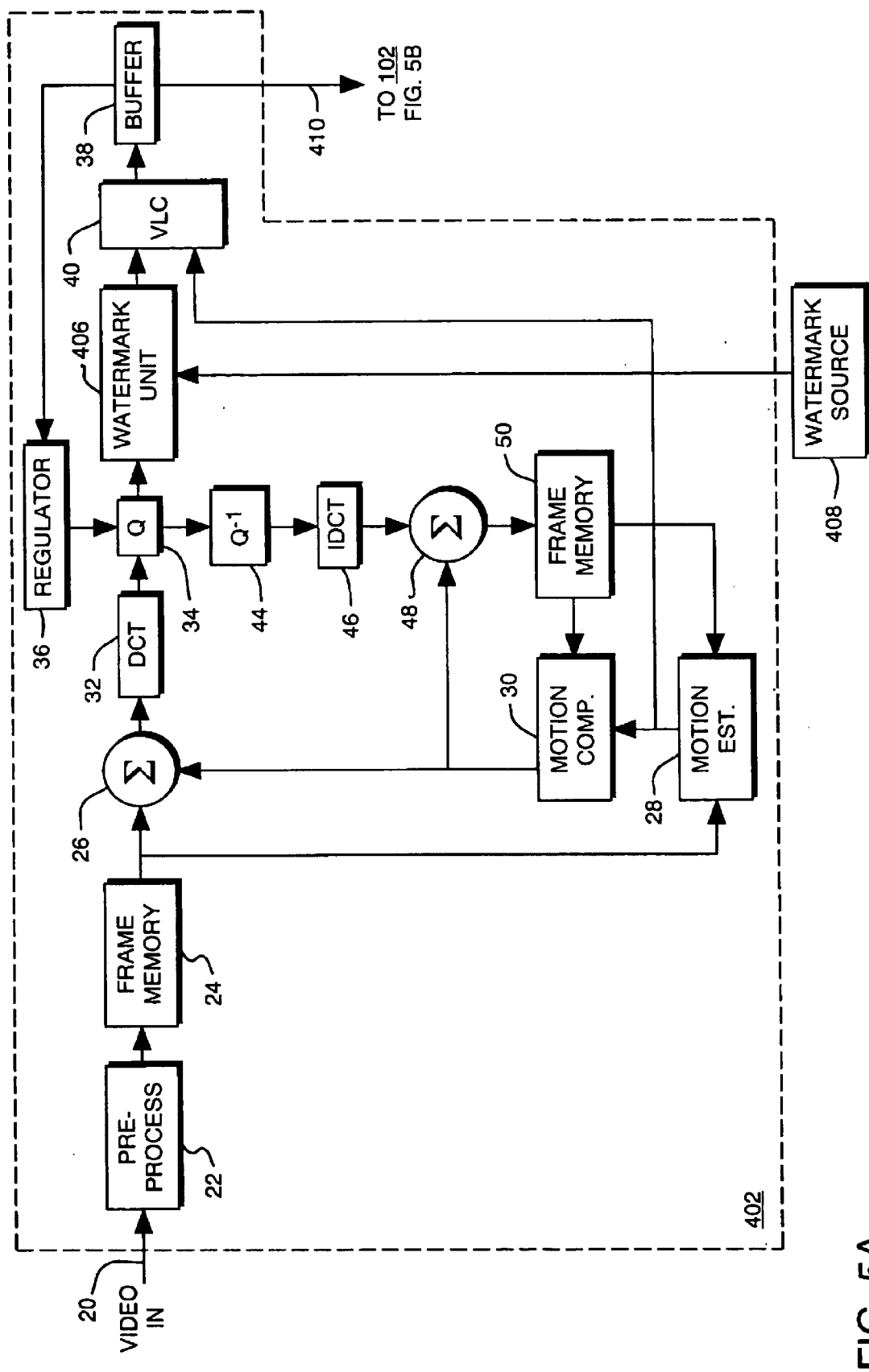
FIG. 5 is a block diagram of an embodiment of an MPEG encoder and an MPEG decoder using digital watermarking.
Figure 5B:
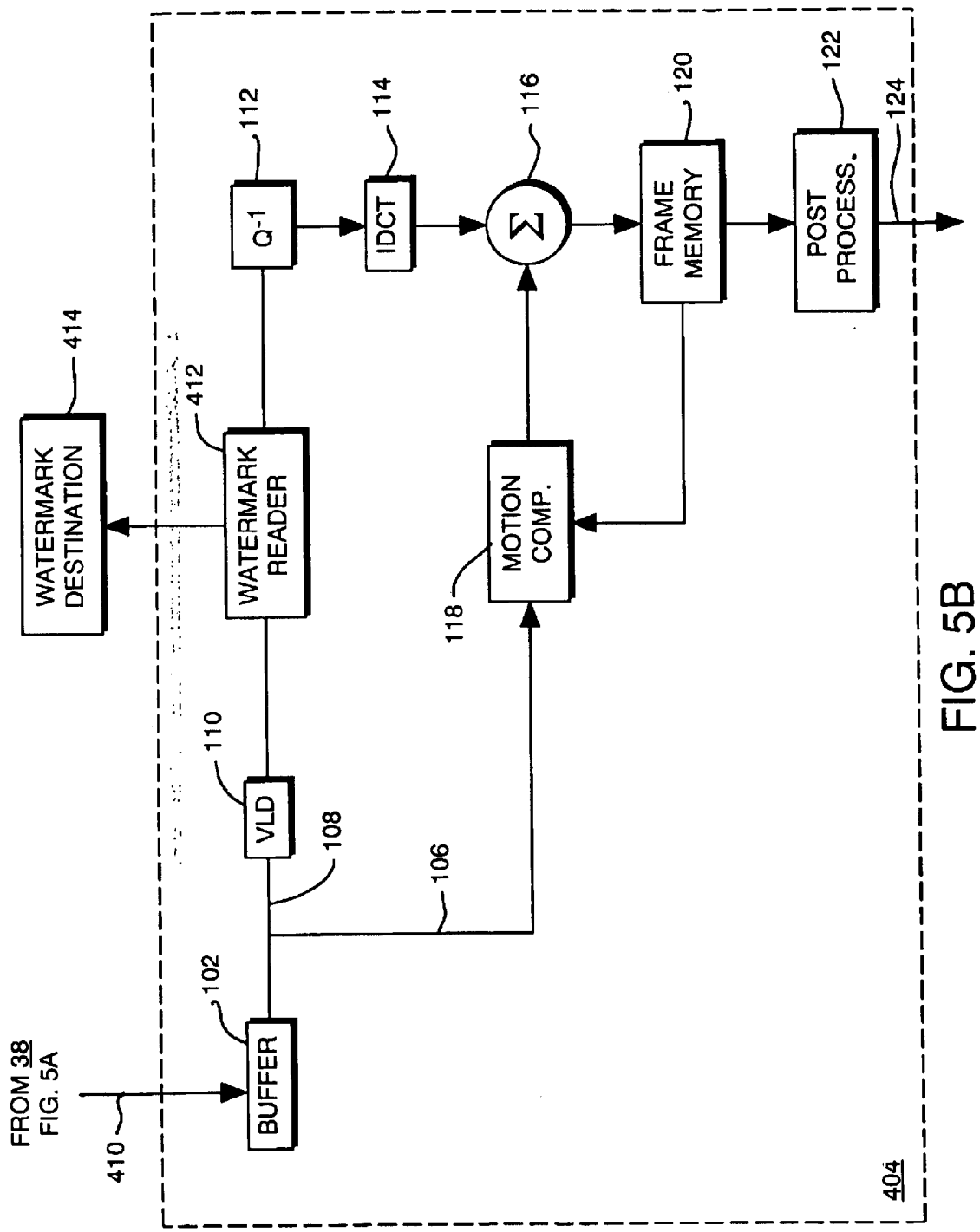

FIG. 5 is a block diagram of an embodiment of an MPEG encoder 402 and an MPEG decoder 404 using digital watermarking. The MPEG encoder 402 and the MPEG decoder 404 are similar to the MPEG encoder of FIG. 1 and the MPEG decoder of FIG. 2. Thus, the reference numbers used in FIG. 5 correspond in part with the reference numbers used in FIGS. 1 and 2, with differences as noted below. The MPEG encoder 402 includes a watermark unit 406 between the quantizer 34 and the VLC 40. The watermark unit 406 receives a digital watermark from a watermark source 408. The watermark source 408 may be any source of digital data, including a random access memory or a read-only memory, and the digital data comprising each watermark may include any encrypted or un-encrypted designation of origin, or other message content that is desired to be transmitted along with the MPEG video stream. The watermark unit 406 operates according to the watermarking systems described above and may use, for example, a micro-coded implementation of the above pseudo-code. Watermarked blocks are transmitted from the watermark unit 406 to the VLC 40 and buffer 38.

The MPEG video stream including the watermark is transmitted from the buffer 38 of the MPEG encoder 402 to the MPEG decoder 404 using a suitable communication link 410, and is received by the buffer 102 of the MPEG decoder 404. Each block of video data is forwarded to the variable-length decoder 110 where all of the zero coefficients are restored. A watermark reader 412 reads the watermark from the blocks using an operation corresponding to the operation used by the watermark unit 406. After reading, each block will still contain the watermark. The watermark can only be removed if it is known a priori at the watermark reader 412. The watermark is provided to a watermark destination 414, which can be, for example, a random access memory associated with the MPEG decoder 404.

Figure 6:
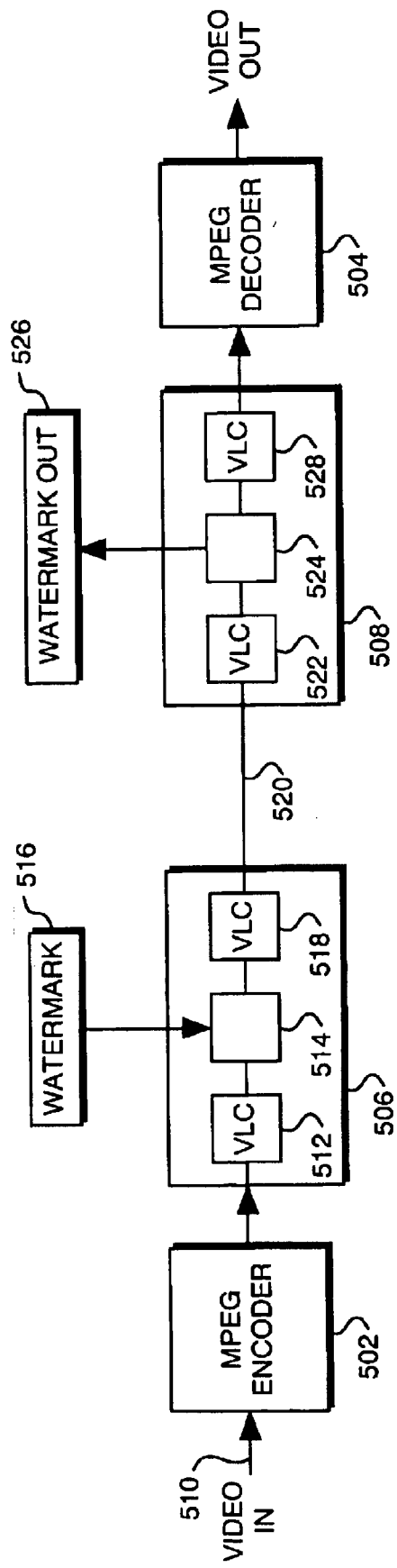
FIG. 6 is a block diagram of another embodiment of an MPEG encoder and MPEG decoder using digital watermarking.

FIG. 6 is a block diagram of another embodiment of an MPEG encoder 502 and an MPEG decoder 504 using digital watermarking. In this configuration, the MPEG encoder 502 and the MPEG decoder 504 are conventional MPEG components that are readily commercially available. A watermark etching device 506 and a watermark reading device 508 are connected thereto to provide external watermarking. The watermark etching device 506 is connected to the MPEG encoder 502 to receive an MPEG video stream encoded from a video source 510. The watermark etching device 506 includes a variable-length decoder 512 that reconstructs each block of video data. The variable-length decoder 512 transmits the blocks to a watermark unit 514 that operates in a manner similar to the watermark unit 406 of FIG. 5 to insert a watermark from a watermark source 516. Each watermarked block is then returned to an MPEG video stream format by variable-length encoding the blocks again in a VLC 518. The watermarked MPEG video stream is than transmitted over a suitable communication link 520.

The watermarked MPEG video stream is received by the watermark reading device 508 over the communication link 520. The watermark reading device 508 may be omitted, and the watermarked MPEG video stream may thus be decoded and viewed like a conventional MPEG video stream by the MPEG decoder 504. Alternatively, the MPEG decoder can include an integrated watermark reader such as that shown in FIG. 5. The watermark reading device 508 includes a variable-length decoder 522 that reconstructs each block of the MPEG video stream. A watermark reader 524 then reads a watermark from the blocks as described above, and transmits the watermark to a watermark destination 526, which may be, for example, a random access memory associated with the MPEG decoder 504 or the watermark reading device 508. After a watermark is read, each block is variable-length encoded again using a VLC 528 and transmitted to the MPEG decoder 504 for subsequent decoding of video content.

While the above description relates to a technique for etching a digital watermark into a digital multimedia stream, it does not describe what that digital watermark may be, i.e., what bit stream makes up the watermark. As will be explained below, a "histogram watermark" or "message authentication code" may be formed from a histogram analysis of data in each block. This message authentication code has the desirable property of describing the underlying digital content, which is useful, for example, in tamper-detection. It will be appreciated that the message authentication code described below may be practiced with the digital watermarking techniques described above, or with other watermarking techniques known in the art.

Figure 7:
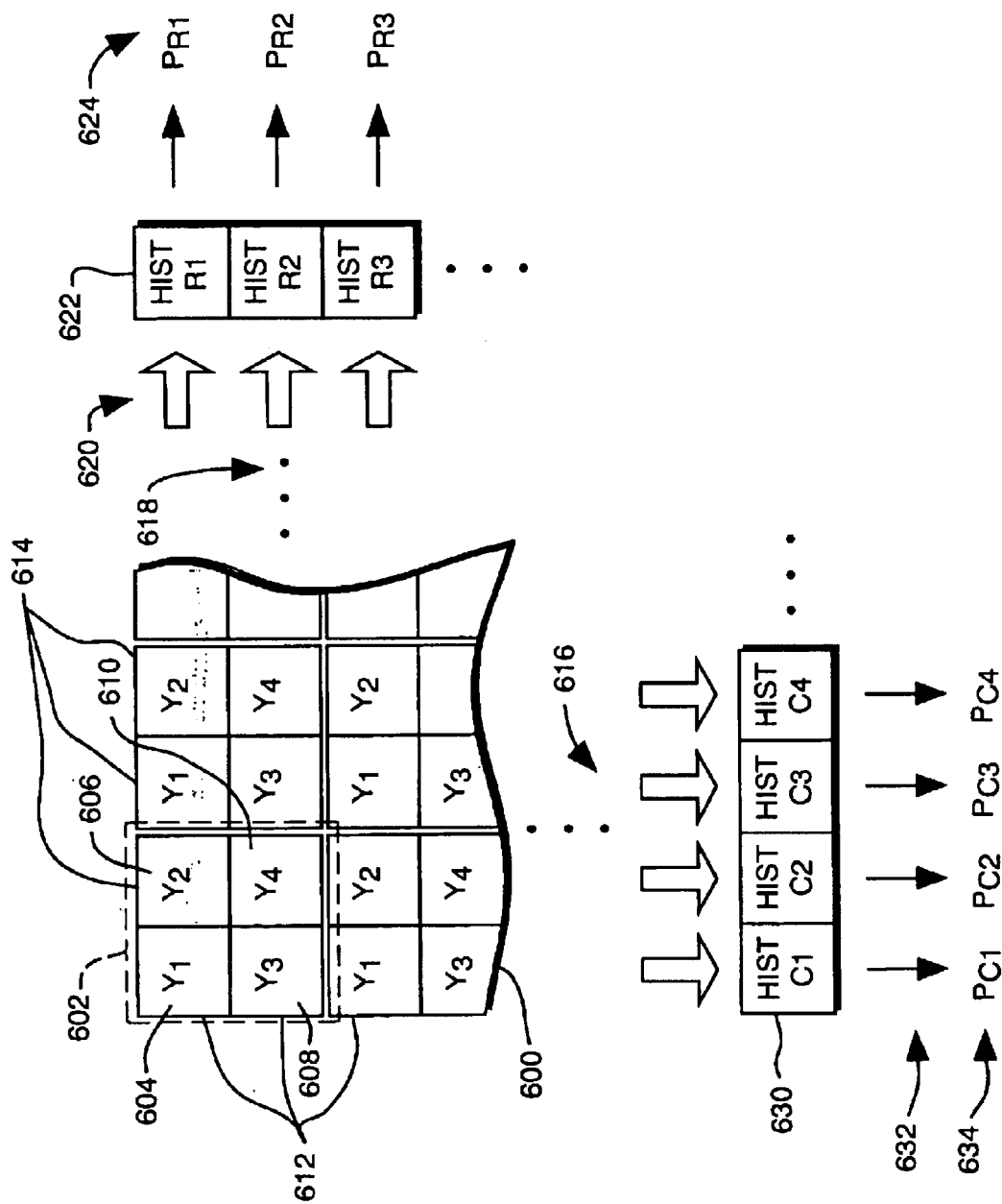
FIG. 7 shows an example of a relationship between digital content and parity bits of a histogram message authentication code.

FIG. 7 shows an example of a relationship between digital content and parity bits of a histogram message authentication code. Using the MPEG standard described above, an image 600 is formed from macroblocks 602, each macroblock 602 corresponding to a sixteen-by-sixteen block of image data. Each macroblock 602 includes four luminance blocks 604–610, labeled $Y_1$–$Y_4$, each luminance block including an eight-by-eight matrix of luminance values. These luminance blocks 604–610 contain the same data as the luminance blocks 204–210 of FIG. 3. A preferred embodiment of this watermark may not use the chrominance blocks of the MPEG stream. The luminance blocks 604–610 are arranged into rows 612 and columns 614, with each luminance block 604–610, corresponding to a particular one of the rows 612 and a particular one of the columns 614 of the image 600. Additional rows 612 and columns 614 may be added to describe larger images, as indicated by ellipses 616, 618. One common MPEG format, the main level at main profile, provides for 720×480 pixel frames at thirty frames-per-second. Each frame of this profile contains a matrix of macroblocks with forty-five columns and thirty rows, or to a matrix of corresponding luminance blocks with ninety columns and sixty rows.

In order to provide a compact representation of the image 600, an average value is obtained for each luminance block 604–610. This is obtained from the DC coefficient of each transformed luminance block, and has a value in a range from −1024 to 1023. Other values may be used, such as the gray-scale block average for each un-transformed macroblock, in which case the average will have a (gray-scale) range of 0 to 255. The DC coefficient is preferably used since it requires no additional calculations. For each row 612 of the image 600, a histogram of average values is obtained using bins that cover the range of possible average values. This operation is illustrated generally by arrows 620 and histograms 622. Each histogram 622 is converted to a single parity bit 624, with one parity bit 624 for each row 612 of the image 600. Similarly, for each column 614 of the image 600, a histogram of average values is obtained using bins that cover the range of possible average values. This operation is illustrated generally by arrows 630 and histograms 632. Each histogram 632 is converted to a single parity bit 634, with one parity bit 634 for each column 614 of the image 600.

The parity bits 622 from the rows 612 and the parity bits 632 from the columns 614 are then concatenated to form a message authentication code ("MAC") for the image 600. In an MPEG system, the MAC is preferably generated for each I frame of an MPEG video stream, and appended to, or etched into, a next chronological I frame of the MPEG video stream. In this arrangement, any change in the image 600 that is sufficiently large to move an average value for a block to a different bin of an associated histogram 622, 632 may also affect the parity bit 624, 634 for the associated row 612 and column 614. Thus, in addition to authenticating the MPEG stream, the MAC may provide specific information with respect to the location of any tampering.

Figure 8:
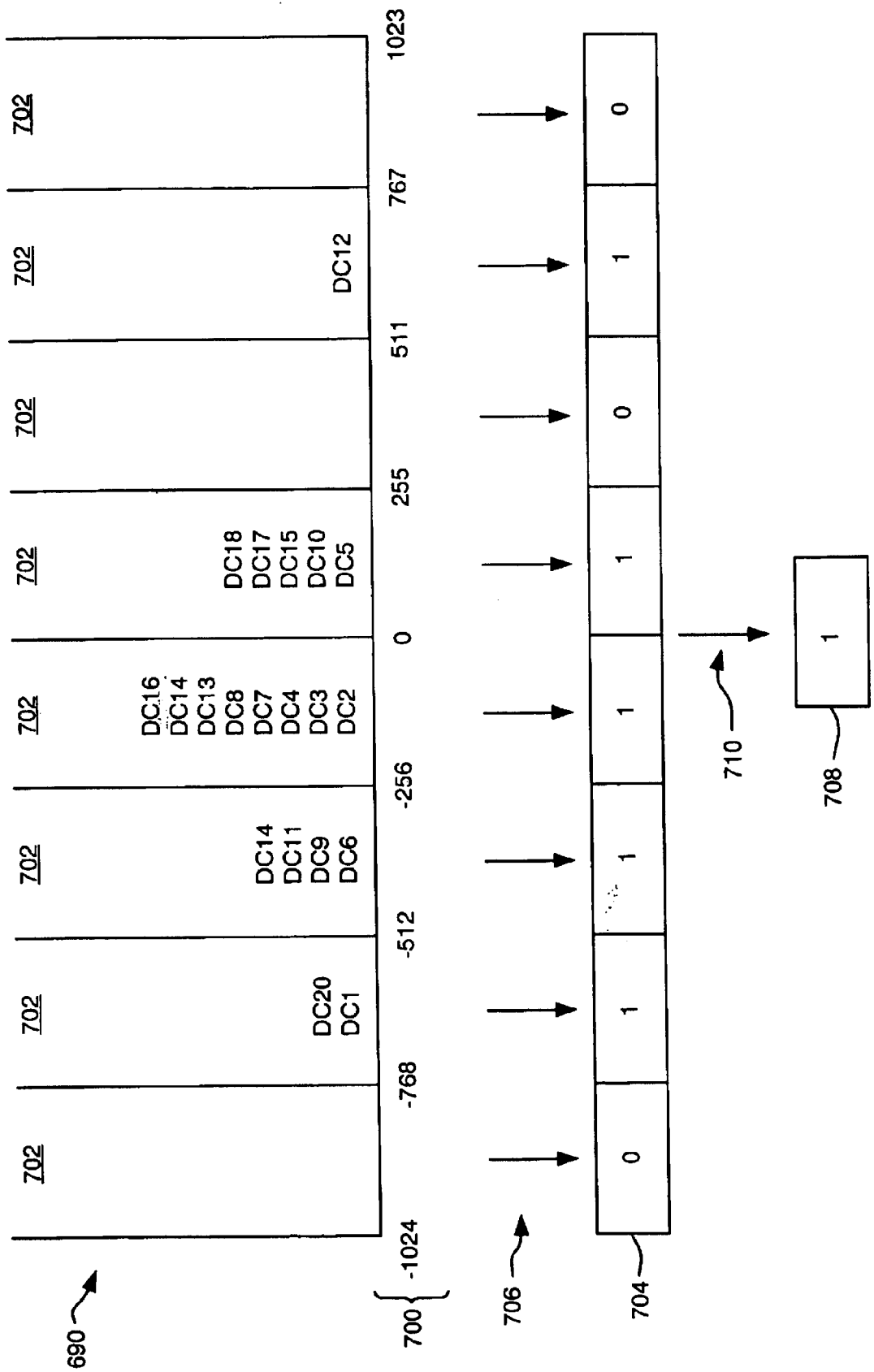
FIG. 8 shows an example of a histogram of DC coefficients used for a message authentication code.

FIG. 8 shows an example of a histogram of DC coefficients used for a message authentication code. The histogram operation and parity bit calculation noted above are described in more detail in connection with this figure. In a histogram 690, a range of possible values 700 is distributed among a plurality of contiguous bins 702. For DC coefficients of an MPEG stream, the bins 702 cover a range from −1024 to 1023, and the bins 702 are preferably eight, evenly space bins. It will be appreciated that other arrangements of bins and bin ranges are possible. In FIG. 8, twenty DC coefficients, designated DC1–DC20, are shown arranged in the bins according to their values. For example, DC1 might have a value of −602, which falls into the bin having a range from −768 to −512. Once the DC coefficients for a row or column have been arranged in a histogram in this fashion, a digital sequence 704 is generated for the histogram, with a one being assigned to each bin that contains any DC coefficients, and a zero being assigned to each bin that does not contain any DC coefficients. This operation is shown by arrows 706 from each bin 702 of the histogram to a corresponding bit of the digital sequence 704. For the histogram of FIG. 8, the digital sequence 704 would be "01111010."

A parity bit 708 is generated from the digital sequence 704. The parity bit 708 is a representation of the digital sequence 704 formed by summing the bits of the digital sequence 704, and by assigning a one or a zero to the parity bit 708 depending on whether the sum is odd or even. This operation is indicated generally by arrow 710. For the example histogram 690 of FIG. 8, the bits of the digital sequence sum to five, which is odd. Accordingly, a one is assigned to the parity bit 708. Once a parity bit 708 has been determined for each row 612 and each column 614, the parity bits 708 are concatenated to form a MAC. The 720×480 pixel image of the MPEG profile mentioned above corresponds to ninety columns and sixty rows of luminance blocks, or a 150 bit MAC. This MAC may be encrypted for further protection using any encryption scheme known in the art. The MAC may additionally include forward error correction or any other error correction code or scheme known in the art, which is particularly useful where a transmission medium does not provide independent error detection and/or correction.

It will be appreciated that variations to the above are possible. For example, not every bin of every histogram need necessarily be used, and not every row and column need necessarily be included in the MAC. Similarly, each row or column may be represented by a plurality of parity bits or other bits that described the coefficient histogram.

Figure 9A:
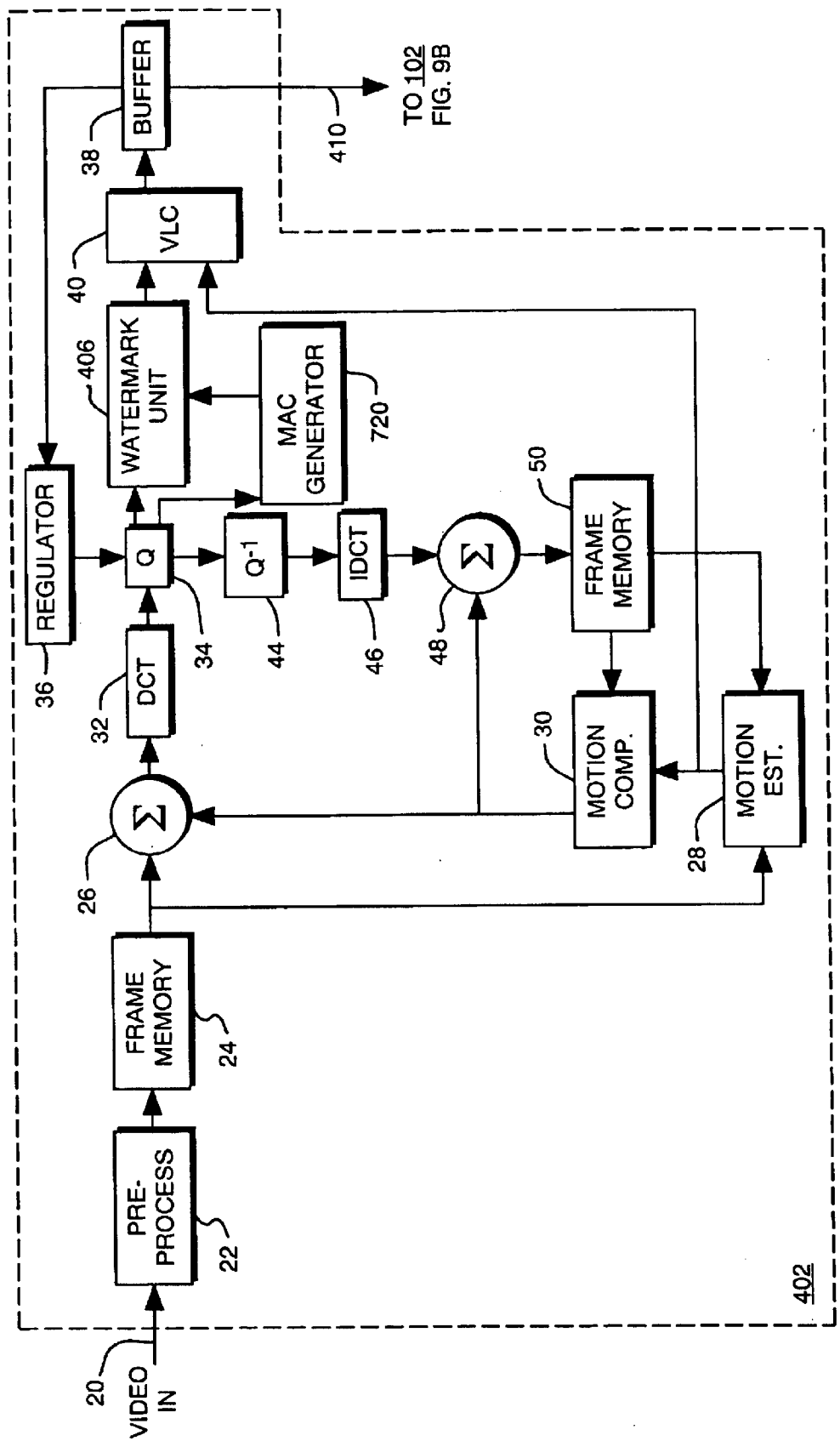
FIG. 9 is a block diagram of an embodiment of an MPEG encoder and MPEG decoder using a histogram message authentication code.
Figure 9B:
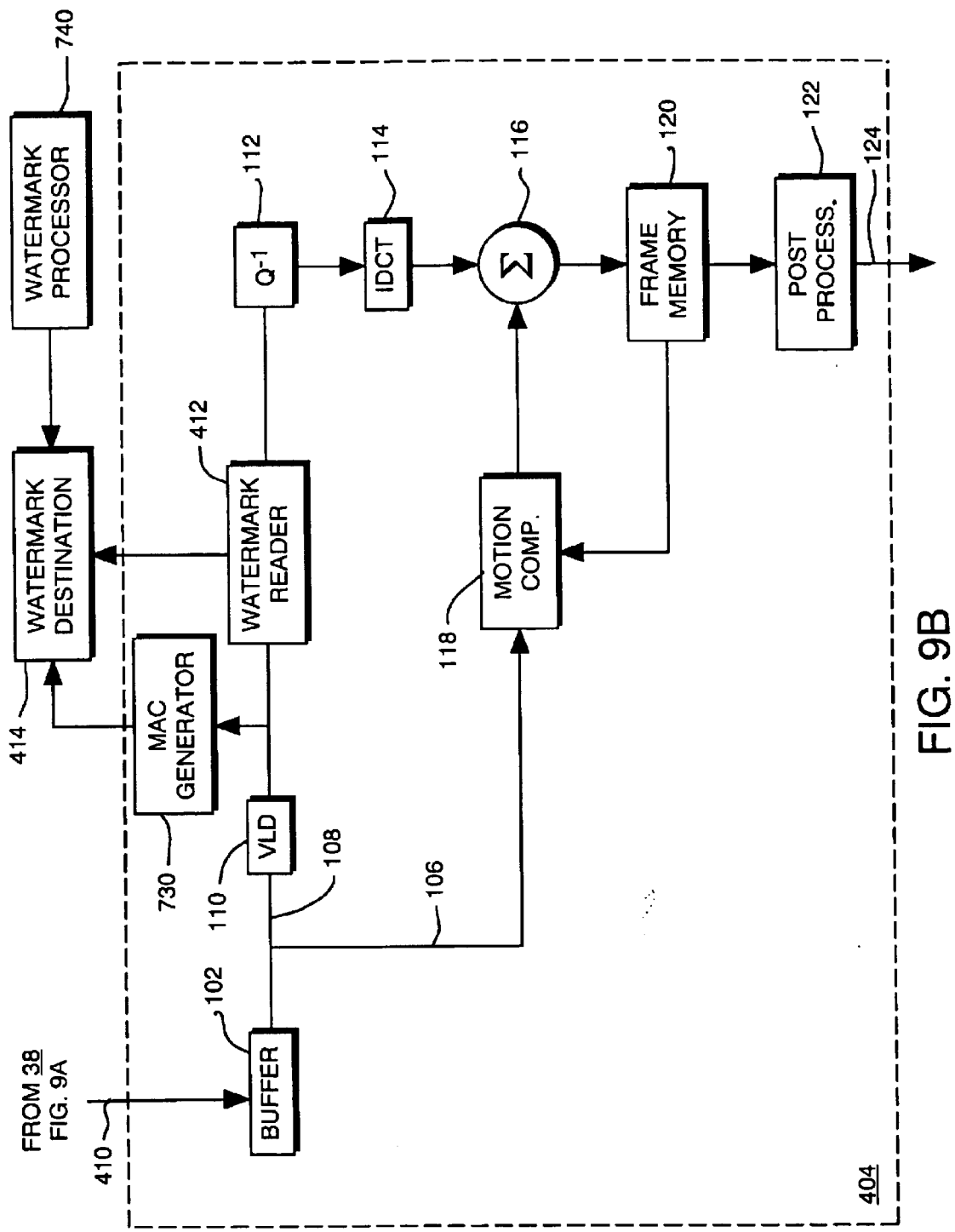

FIG. 9 is a block diagram of an embodiment of an MPEG encoder and MPEG decoder using a histogram message authentication code. It will be appreciated that the histogram watermark may be implemented using any of the techniques described above with respect to the MPEG encoder, MPEG decoder, and watermark unit described above in FIGS. 1, 2, 5, and 6. The MPEG encoder 402 and the MPEG decoder 404 are similar to the MPEG encoder and the MPEG decoder of FIG. 5. Thus, the reference numbers used in FIG. 9 correspond in part with the reference numbers used in FIG. 5, with differences as noted below.

The MPEG encoder 402 includes a first MAC generator 720. The first MAC generator receives quantized blocks from the quantizer 34 and generates a MAC using the histogram watermark technique described above. The MAC digital sequence is fed to the watermark unit 406 where it is etched into the MPEG video stream. The MPEG decoder 404 includes a corresponding MAC generator 730 that receives variable-length decoded (but still quantized) blocks from the variable-length decoder 110 and applies the same histogram watermark technique that was applied by the first MAC generator 720. This generates a MAC digital sequence from the image data in the MPEG video stream, and this MAC digital sequence is transmitted to the watermark destination 414. Additionally, the watermark reader 412 reads any embedded watermark etched into the MPEG video stream by the watermark unit 406 in the MPEG encoder 402 prior to transmission over the communication link 410. This embedded watermark is transmitted to the watermark destination 414, where it may be compared to the "expected" value derived from the image data by the MAC generator 730.

A watermark processor 740 examines the embedded watermark from the watermark reader 412 and the MAC digital sequence from the MAC generator 730. The watermark processor 740 may perform any analysis derived from this comparison. The location of errors in the MAC digital sequence will correspond to particular rows and columns of the MPEG video images. Thus the watermark processor 740 may localize errors to particular coordinates (i.e., a row and a column) and report or store this information. If the embedded watermark matches the MAC digital sequence, then the source of the MPEG video stream can be identified or confirmed by the watermark processor 740. If there is no match when one is expected, then the watermark processor 740 can determine that the MPEG video stream was tampered with during transmission. It will be appreciated that, in operation, this comparison need not yield an exact match between the watermark reader 412 results and the corresponding MAC generator 730 results. It is expected that some variations will appear due to, for example, bit errors in the communication link 410 or slight changes to DC coefficients that occur in the watermark unit 406 while a watermark is being etched.

Many variations to the system of FIG. 9 are possible. The first MAC generator 720 and the corresponding MAC generator 730 may be applied at different locations. For example, the first MAC generator 720 may operate on blocks prior to quantization by the quantizer 34, or prior to transformation by the DCT unit 32. In this case, the corresponding MAC generator 730 would receive blocks from a different location in the MPEG decoder 404, e.g., after the inverse quantization unit 112 or after the inverse DCT unit 114. Similarly, the first MAC generator 720 and the corresponding MAC generator 730 may be provided as standalone components to be used externally with off-the-shelf MPEG codecs. In this case, the first MAC generator 720 and the corresponding MAC generator 730 would include a variable-length decoder and a variable-length coder in order to maintain an MPEG-compliant data stream over the communication link 410.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for etching a digital watermark comprising:
   (a) providing a watermark bit;
   (b) providing a digital media stream comprising a first block and a second block, the first block comprising a first plurality of coefficients, and the second block comprising a second plurality of coefficients, each one of the second plurality of coefficients corresponding to one of the first plurality of coefficients; and
   (c) setting a first difference to a predetermined value according to the watermark bit, the first difference being a difference between a first coefficient of the first block and a corresponding first coefficient of the second block.

2. The method of claim 1 further comprising repeating (a)–(c) for a plurality of consecutive watermark bits and a plurality of consecutive blocks, wherein the second block is used as a new first block, and a third consecutive block is used as a new second block.

3. The method of claim 1 wherein setting the first difference to a predetermined value according to the watermark bit further comprises setting the first difference to a first level if the watermark bit is a one, and setting the first difference to a second level if the watermark bit is a zero.

4. The method of claim 3 wherein the first level is a binary even level and the second level is a binary odd level.

5. The method of claim 4, wherein setting the first difference to a binary even level further comprises adding a quantization level to the corresponding first coefficient if the first difference is odd, and wherein setting the first difference to a binary odd level further comprises adding a quantization level to the corresponding first coefficient if the first difference is even.

6. The method of claim 1 further comprising:
providing a second watermark bit; and
setting a second difference to a predetermined value according to the second watermark bit, the second difference being a difference between a second coefficient of the first block and a corresponding second coefficient of the second block.

7. The method of claim 2 wherein the plurality of consecutive watermark bits comprises an encrypted watermark.

8. The method of claim 1 wherein the digital media stream comprises a Motion Picture Expert Group video stream, the first coefficient being a DC coefficient.

9. The method of claim 1 wherein the digital media stream comprises a Motion Picture Expert Group video stream, the first coefficient being an AC coefficient.

10. A method for reading a digital watermark comprising:
(a) receiving a digital media stream comprising a first block and a second block, the first block comprising a first plurality of coefficients, and the second block comprising a second plurality of coefficients, each one of the second plurality of coefficients corresponding to one of the first plurality of coefficients;
(b) determining a first difference between a first coefficient of the first block and a corresponding first coefficient of the second block; and
(c) determining a watermark bit, the watermark bit having a predetermined value according to the first difference.

11. The method of claim 10 further comprising repeating (a)–(c) for a plurality of consecutive blocks, wherein the second block is used as a new first block, and a third consecutive block is used as a new second block, thereby determining a plurality of consecutive watermark bits.

12. The method of claim 10, the predetermined value being a one if the first difference has a first level, and the predetermined value being a zero if the first difference has a second level.

13. The method of claim 12 wherein the first level is a binary even level and the second level is a binary odd level.

14. The method of claim 10 further comprising:
determining a second difference between a second coefficient of the first block and a corresponding second coefficient of the second block; and
determining a second watermark bit, the second watermark bit having a second predetermined value according to the second difference.

15. The method of claim 11 wherein the plurality of consecutive watermark bits comprises an encrypted watermark.

16. The method of claim 10 wherein the digital media stream comprises a Motion Picture Expert Group video stream and the first coefficient is a DC coefficient.

17. The method of claim 10 wherein the digital media stream comprises a Motion Picture Expert Group video stream and the first coefficient is an AC coefficient.

18. A system for etching a digital watermark comprising:
means for providing a watermark bit;
means for providing a digital media stream comprising a first block and a second block, the first block comprising a first plurality of coefficients, and the second block comprising a second plurality of coefficients, each one of the second plurality of coefficients corresponding to one of the first plurality of coefficients;
means for either setting a first difference to a first level if the watermark bit is a one, or setting the first difference to a second level if the watermark bit is a zero, the first difference being a difference between a first coefficient of the first block and a corresponding first coefficient of the second block; and
means for providing a plurality of consecutive watermark bits and a plurality of consecutive blocks to the above means, wherein the second block is used as a new first block, and a third consecutive block is used as a new second block.

19. The system of claim 18 wherein the first level is a binary even level and the second level is a binary odd level.

20. The system of claim 18 further comprising:
means for providing a second watermark bit; and
means for either setting a second difference to be even if the watermark bit is a one, or setting the second difference to be odd if the watermark bit is a zero, the second difference being a difference between a second coefficient of the first block and a corresponding second coefficient of the second block.

21. The system of claim 18 further comprising means for encrypting the plurality of consecutive watermark bits into an encrypted watermark.

22. The system of claim 18 further comprising means for variable-length decoding the first plurality of coefficients and the second plurality of coefficients before applying the determining means and the setting means, and means for variable-length coding the first plurality of coefficients and the second plurality of coefficients after applying the determining means and the setting means.

23. A digital video encoder comprising:
a watermark source, the watermark source providing a plurality of watermark bits;
a transform unit, the transform unit receiving a plurality of blocks of video data and performing a two-dimensional transform on each block to provide a transformed block, each transformed block including a plurality of coefficients;
a quantizer, the quantizer receiving each transformed block and scaling each coefficient of each transformed block using a quantization index, thereby providing a plurality of quantized blocks; and
a watermark unit, the watermark unit receiving one of the plurality of watermark bits from the watermark source, a first one of the plurality of quantized blocks, and a second one of the plurality of quantized blocks, the watermark unit encoding the one of the plurality of watermark bits by setting a difference to be even if the one of the plurality of watermark bits has a first value and setting the difference to be odd if the one of the plurality of watermark bits has a second value, the difference being a difference between a first coefficient of the first one of the plurality of quantized blocks and a corresponding first coefficient of the second one of the plurality of quantized blocks.

24. The digital video encoder of claim 23 wherein the first coefficient and the corresponding first coefficient are DC coefficients.

25. The digital video encoder of claim 23 wherein the first coefficient and the corresponding first coefficient are AC coefficients.

26. The digital video encoder of claim 23 wherein setting the difference to be even comprises adding a quantization level to the corresponding first coefficient if the difference is odd, and wherein setting the difference to be odd comprises adding a quantization level to the corresponding first coefficient if the difference is even.

27. The digital video encoder of claim 24 wherein the plurality of quantized blocks comprises a Motion Picture Expert Group video stream.

28. A digital watermark embodied in a digital video stream carrier signal, the digital watermark comprising a plurality of watermark bits, each watermark bit having a value encoded between consecutive blocks of the digital video stream, the value being a first value when a difference between a pair of consecutive corresponding coefficients is even, and the value being a second value when the difference between the pair of consecutive corresponding coefficients is odd.

29. The digital watermark of claim 28, wherein the first value is one and the second value is zero.

30. The digital watermark of claim 28, wherein the first value is zero and the second value is one.

31. The digital watermark of claim 28 wherein the pair of consecutive corresponding coefficients are each DC coefficients.

32. The digital watermark of claim 28 wherein the pair of consecutive corresponding coefficients are each AC coefficients.

33. A computer program product for etching a digital watermark, embodied in machine executable code for performing the following steps:

(a) providing a watermark bit;

(b) providing a digital media stream comprising a first block and a second block, the first block comprising a first plurality of coefficients, and the second block comprising a second plurality of coefficients, each one of the second plurality of coefficients corresponding to one of the first plurality of coefficients; and (c) setting a first difference to a predetermined value according to the watermark bit, the first difference being a difference between a first coefficient of the first block and a corresponding first coefficient of the second block.

34. The computer program product of claim 33, further comprising machine executable code for repeating (a)–(c) for a plurality of consecutive watermark bits and a plurality of consecutive blocks, wherein the second block is used as a new first block, and a third consecutive block is used as a new second block.

35. The computer program product of claim 33 wherein setting the first difference to a predetermined value according to the watermark bit further comprises setting the first difference to a first level if the watermark bit is a one, and setting the first difference to a second level if the watermark bit is a zero.

36. The computer program product of claim 35 wherein the first level is a binary even level and the second level is a binary odd level.

37. The computer program product of claim 36 wherein setting the first difference to a binary even level further comprises adding a quantization level to the corresponding first coefficient if the first difference is odd, and wherein setting the first difference to a binary odd level further comprises adding a quantization level to the corresponding first coefficient if the first difference is even.

38. The computer program product of claim 33 further comprising machine executable code for performing the following steps:

providing a second watermark bit; and setting a second difference to a predetermined value according to the second watermark bit, the second difference being a difference between a second coefficient of the first block and a corresponding second coefficient of the second block.

39. The computer program product of claim 34 wherein the plurality of consecutive watermark bits comprises an encrypted watermark.

40. The computer program product of claim 33 wherein the digital media stream comprises a Motion Picture Expert Group video stream, the first coefficient being a DC coefficient.

41. The computer program product of claim 33 wherein the digital media stream comprises a Motion Picture Expert Group video stream, the first coefficient being an AC coefficient.

* * * * *